United States Patent [19]

Bueler

[11] 3,776,602
[45] Dec. 4, 1973

[54] CONTROL VALVE
[75] Inventor: Richard C. Bueler, Des Peres, Mo.
[73] Assignee: Wagner Electric Corporation, Newark, N.J.
[22] Filed: Aug. 23, 1972
[21] Appl. No.: 282,945

[52] U.S. Cl. .............. 303/6 C, 188/349, 303/84 R
[51] Int. Cl. ............................................. B60t 11/34
[58] Field of Search .............. 303/6 C, 84 A, 84 R; 188/349, 152, 151 A; 137/102, 493.7, 505.25, 493.6

[56] References Cited
UNITED STATES PATENTS
3,232,057  2/1966  Kersting ............................. 303/6 C
3,498,681  3/1970  Bueler ................................ 303/6 C
3,501,203  3/1970  Falk ................................... 303/6 C
3,508,792  4/1970  Bueler ................................ 188/349

Primary Examiner—Duane A. Reger
Assistant Examiner—D. C. Butler
Attorney—Joseph E. Papin

[57] ABSTRACT

A control valve is provided with a proportioning valve generally operable to effect the application through said control valve of a reduced applied fluid pressure in a predetermined ratio with fluid pressure supplied thereto between first and second predetermined values, and another proportioning valve is movable in said first named proportioning valve and generally operable in response to supplied fluid pressures between the second predetermined value and a third predetermined value acting thereon to increase the reduced applied fluid pressure in another predetermined ratio, said other proportioning valve being responsive to supplied fluid pressure acting thereon in excess of the third predetermined value to blend the supplied and applied fluid pressures.

9 Claims, 3 Drawing Figures

PATENTED DEC 4 1973 3,776,602
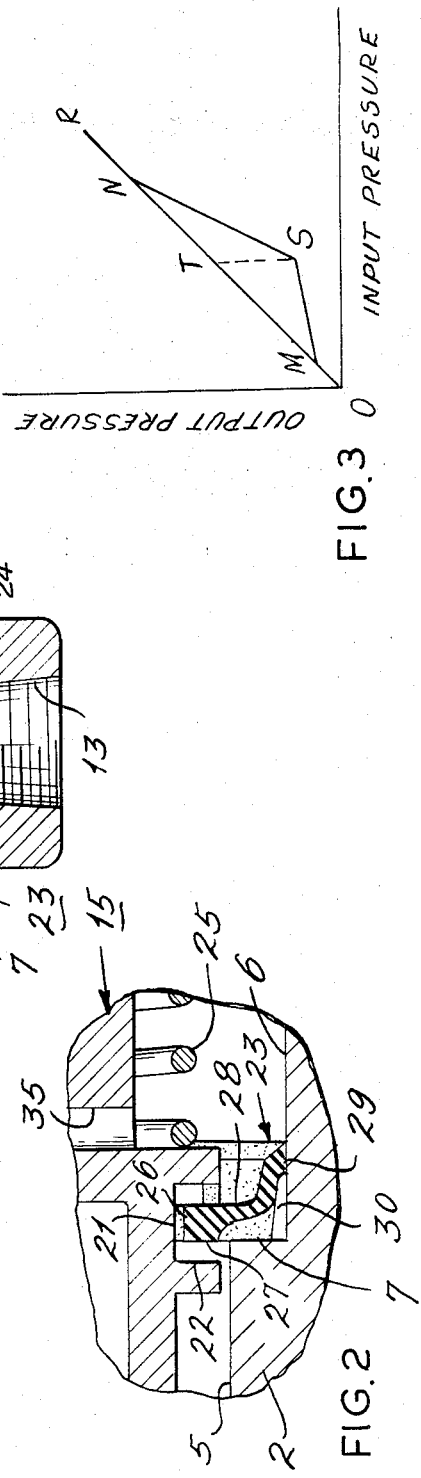
FIG.3
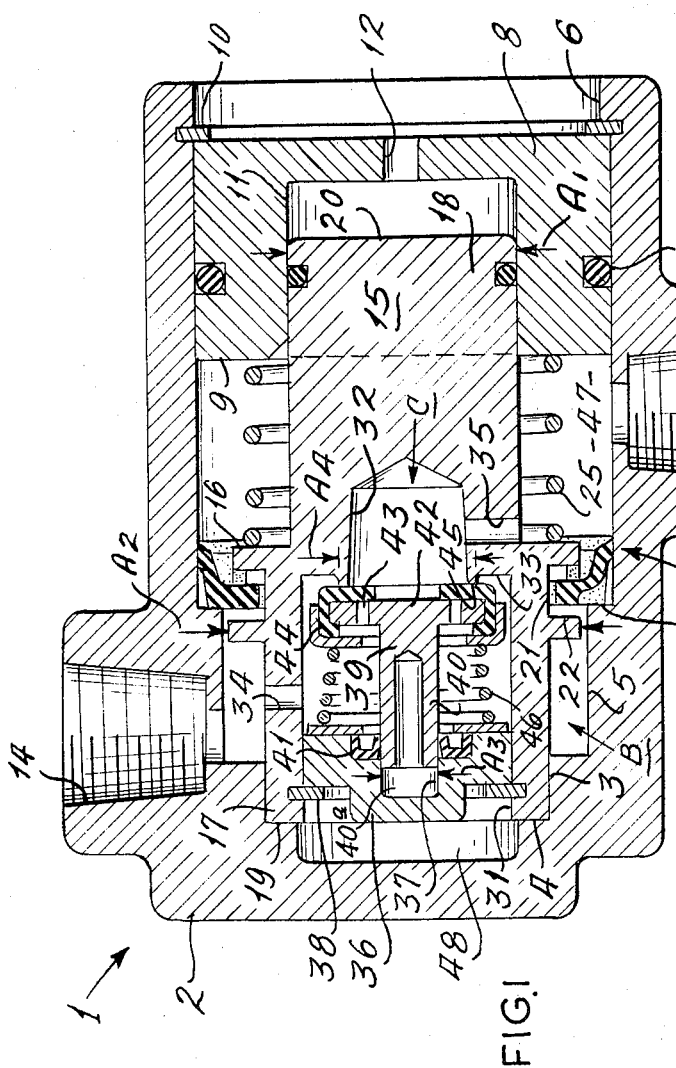
FIG.1
FIG.2

CONTROL VALVE

FIELD OF THE INVENTION

This invention pertains generally to control valves and in particular to those utilized in a vehicle brake system for modulating the fluid pressure applied to the vehicle front axle brakes.

BACKGROUND OF THE INVENTION

In the past vehicle brake systems, the braking capacity between the front and rear axle brakes of a truck or tractor for use with a trailer was usually balanced or divided so that the front axle brakes accomplished 25 to 35 percent of the braking effort and the rear axle brakes accomplished th other 65 to 75 percent of such braking effort. Due to the Newtonian mechanics of decelerating or stopping a vehicle which involves the vehicle length of wheel base, static load distribution, and the height of the vehicle center of gravity from the roadbed, etc., the potential torque increase or increased braking effort of the front axle brakes due to high deceleration vehicle stops can be of such magnitude as to result in front to rear axle brake balance, or redistribution of such brake balance, in the range of 50 percent for the front axle brakes and 50 percent for the rear axle brakes or perhaps even greater. In order to take advantage of the front to rear axle brake torque redistribution, front axle brakes having the capacity to accommodate such redistribution must be provided on the vehicle, such as front axle brakes having significantly greater torque or braking effort generating potential. When the front axle brakes having the aforementioned significantly greater torque or braking effort generating potential was provided in the vehicle, the aforementioned redistribution of front to rear axle braking efforts effected during rather high vehicle decelerations resulted in the folloiwng undesirable or disadvantageous features: (1) an increasing tendency for early front wheel skidding; (2) a deleterious effect on vehicle steerability; (3) a deleterious imposition of increased loads or forces on the vehicle front suspension components during braking; and (4) a deleterious imposition of significantly increased loads on the vehicle front tires during braking which results in premature front tire wear. From the foregoing, it is apparent that high levels of front axle brake torque are required to produce high vehicle deceleration rates, but high levels of front axle brake torque can only be utilized if high vehicle decelerations were actually produced; however, this apparent paradox was due to the fact that high vehicle deceleration rates were required to effect sufficient weight transfer to the front axle to effect the utilization of the large magnitudes of front axle torque.

The principle object of the present invention is to provide a control valve for use in a vehicle brake system to predeterminately control fluid pressure applied to the vehicle front axle brakes which overcomes the aforementioned disadvantageous or undesirable features, and this, as well as other objects and advantageous features of the present invention, will become apparent from the specification which follows.

SUMMARY OF THE INVENTION

Briefly, the present invention includes a control valve having modulating means operable generally for performing modulating operations on fluid pressure supplied thereto to establish an applied fluid pressure in a predetermined ratio under preselected conditions, and other modulating means movable in said first named modulating means and operable generally for performing modulating operations on the supplied fluid pressure in excess of a predetermined value to establish the applied fluid pressure in another predetermined ratio with the supplied fluid pressure.

RELATED PATENTS

This patent application is related to the R. C. Bueler U. S. Pat. No. 3,508,792 issued Apr. 28, 1970 and assigned to the common assignee of this patent application which is a patentably distinct improvement.

BRIEF DESCRIPTION OF THE DRAWINGS

In the drawings which illustrate an embodiment of the present invention and wherein like numerals refer to like parts wherever they occur:

FIG. 1 is a sectional view illustrating a control valve embodying the present invention in cross-section;

FIG. 2 is an enlarged fragmentary view taken from FIG. 1 showing the seating member and proportioning piston in cross-section; and FIG. 3 is a graphical representation illustrating the applied or output fluid pressure effected by the con-trol valve of FIG. 1 in response to the supplied or input fluid pressure.

DETAILED DESCRIPTION OF THE INVENTION

Referring now to the drawings in detail and in particular to FIG. 1, a control valve 1 is provided with a housing 2 having a blind bore 3 therein defining a housing end wall or abutment 4 and coaxially aligned with stepped counterbores 5 and 6, and an annular shoulder or abutment 7 is provided on said housing between said counterbores. A closure member or end plug 8 having an interior end 9 is received in the open end of the housing counterbore 6 and retained therein against displacement by a snap ring and groove assembly 10 provided in said housing counterbore. The closure member 8 is also provided with a bore 11 intersecting with the closure member interior end 9 and vented to atmosphere by a passage 12 provided in said closure member. An inlet port 13 which is adapted for connection with the vehicle brake system foot or application valve (not shown) is provided in the housing 2 intersecting with the counterbore 6, and an outlet port 14 which is adapted for connection with the vehicle front axle brakes (not shown) is also provided in said housing intersecting with the counterbore 5.

A modulating, proportioning or metering member, such as the piston indicated generally at 15, is provided with an annular radially extending flange portion 16 interposed between opposed extensions 17, 18 having end portions 19, 20 slidably received in the housing and closure member bores 3, 11, respectively, and peripheral groove means 21 is provided in said flange portion defining an annular shoulder or valve member 22 for metering engagement with a cooperating seating member, such as the annular cup member indicated generally at 23 and discussed hereinafter. A peripheral seal or O-ring 24 is carried in the piston extension 18 adjacent to the end portion 20 thereof in sealing engagement with the closure member bore 11, and a proportioning or metering spring 25 is precompressed between the closure member interior end 9 and the proportioning piston flange 16 normally urging the proportioning piston 15 toward an inoperative or at rest position engaging the end portion 19 of the piston extension 17 with the housing end wall 4.

The seating member 23 is provided with a centrally located aperture 26 extending axially therethrough between opposed side portions 27, 28 of said seating member and radially spaced from the groove 21 of the proportioning piston 15. The seating member side 27 is normally seated in abutting engagement with the housing shoulder 7 and also defines a valve seat about the seating member aperture 26 for metering or proportioning engagement with the valve member 27 of the proportioning piston 15. The seating member 23 is also provided with a peripheral lip 29 in sealing engagement with the housing counterbore 6, and a plurality of axially extending return flow passages 30 are provided between the seating member side 27 and lip 29, said return flow passages normally being closed by the sealing engagement of said lip with said housing counterbore.

A pair of stepped bores 31, 32 are coaxially provided in the proportioning piston 15 intersecting with the leftward end portion 19 thereof, and an annular shoulder 33 which defines a valve seat is provided on said proportioning piston between said stepped bores. Radially extending cross-passages 34, 35 are provided in the proportioning piston extensions 19, 20 connecting between the peripheral surfaces thereof and the stepped bores 31, 32 in open pressure fluid communication with the outlet and inlet ports 17, 16, respectively, and a valve guide or retainer member 36 having a blind bore 37 therein is disposed in the larger stepped bore 31 and maintained against displacement therefrom by a snap ring and groove assembly 38 provided in said larger stepped bore.

A proportioning, modulating or metering valve member 39 is provided with a stem portion 40 which is slidably received in the valve guide bore 37 and defining therewith an chamber 40a, and a seal 41 is disposed between said stem portion and said valve guide member to isolate the atmospheric chamber 40a from the proportioning piston stepped bore 31. The valve stem 40 is integrally formed with a head portion 42 having a plurality of return flow passages 43 therethrough. An annular seal or cup member 44 is disposed on the valve head portion 42 having a flapper or lip portion 45 sealably engaged with said valve head portion about the return flow passages 43 to normally close said return flow passages, and a metering or proportioning spring 46 is biased between the valve guide member 36 and the valve head member 42 urging the valve member 39 leftwardly to engage the seal 44 thereof in sealing engagement with the proportioning piston valve seat 33 interrupting pressure fluid communication between the stepped bores 31, 32 of said proportioning piston.

An inlet chamber 47 is defined in the housing counterbore 6 between the sealing engagement of the proportioning piston seal 24 with the closure member bore 11 and the sealing engagement of the proportioning piston valve member 22 and the seating member valve seat 27, said inlet chamber being connected in pressure fluid communication with the inlet port 13 at all times. An outlet chamber 48 is defined in the housing bore and counterbore 3, 5 between the bore end wall 4 and the seating engagement of the proportioning piston valve member 22 with the seating member valve seat 27, said outlet chamber being connected in open pressure fluid communication with the outlet port 14 at all times.

The sealing engagement of the proportioning piston seal 24 with the closure member bore 11 defines an effective area $A_1$ on the proportioning piston 15 which is vented to atmosphere through the closure member passage 12, and the sealing engagement of the proportioning piston valve member 22 with the seating member valve seat 27 defines an effective area $A_2$ on said proportioning piston which is subjected to the fluid pressure at the outlet port 14, said area $A_2$ being opposed to and predeterminately greater than the area $A_1$. The sealing engagement of the guide member seal 41 with the stem portion 40 of the proportioning valve 39 defines an effective area $A_3$ on said proportioning valve which is subjected to the atmosphere in the valve guide bore 37, and the sealing engagement of said proportioning valve with the proportioning piston valve seat 33 defines another effective area $A_4$ on said proportioning piston which is subjected to the fluid pressure at the inlet port 13, said area $A_4$ being opposed to and predeterminately greater than the area $A_3$.

To complete the description of the control valve 1, it should be noted that the inlet and outlet chambers 47, 48 and the seating member aperture 26 therebetween define a flow passage, indicated generally at B, between the inlet and outlet ports 13, 14 which is controlled by the proportioning piston 15, as discussed hereinafter, and the connecting passages 34, 35 and stepped bores 31, 32 in said proportioning piston define another flow passage, indicated generally at C, which is connected in parallel or shunt flow relation with the flow passage B between said inlet and outlet ports and controlled by the metering valve 39, as also discussed hereinafter.

OPERATION

With the component parts of the control valve 1 positioned as shown in FIG. 1 and as described hereinbefore, a supplied or input fluid pressure delivered by the operator actuation of a vehicle brake system foot or application valve (not shown) to the inlet port 13 flows therefrom through the inlet chamber 47, the aperture 26 of the seating member 23, and the outlet chamber 48 to establish an applied or output fluid pressure Po at the outlet port 14 for transmission to the vehicle front axle brakes (not shown), and as apparent from the graphical representation in FIG. 3, the input and output fluid pressures P, Po are substantially equal until the magnitude of said input and output fluid pressures attain the predetermined value M. When the input and output fluid pressures P, Po attain the predetermined value M, the output fluid pressure Po acting on the effective or closing area $A_1$ of the proportioning piston 15 creates a closing force Po $A_1$ urging said proportioning piston against the compressive force Fs of the proportioning spring 25 toward an isolating position engaging the proportioning piston valve member 22 with the seating member valve seat 27 to interrupt pressure fluid communication through the seating member aperture 26 between the inlet and outlet chambers 47, 48 thereby isolating the supplied fluid pressure P at the inlet port 13 from the applied fluid pressure Po at the outlet port 14.

With the proportioning valve piston 15 in its isolating position engaging the valve member 22 thereof with the seating member valve seat 27, the closing force Po $A_1$ is eliminated, and the input field pressure P acts on the input area $A_2 - A_1$ of said proportioning piston to establish an input force $P(A_2 - A_1)$ which is additive to the proportioning spring force Fs and in opposition to an output force $Po\ A_2$ established by the output fluid pressure at the outlet port 14 acting on the output area $A_2$ of said proportioning piston. When the input fluid pressure P at the inlet port 13 is increased to a value in excess of the predetermined value M by the line MT in the graph of FIG. 3, the input force $P(A_2 - A_1)$ is correspondingly increased and assisted by the proportioning spring force Fs to move the proportioning piston 15 leftwardly against the output force $Po\ A_2$ toward a modulating, proportioning or metering position disengaging the proportioning piston valve seat 22 from the seating member valve seat 27 to establish metered pressure fluid communication through the seating member aperture 26 between the inlet and outlet chambers 47, 48 and effect a metered increase in the output fluid pressure Po at the outlet port 14 to a value in excess of the predetermined value M but less than the predetermined value S, as shown by the line MS in the graph of FIG. 3. Of course, the output force $Po\ A_2$ is correspondingly increased with the metered increase in the output fluid pressure Po in the outlet chamber 48, and when the output force $Po\ A_2$ is so increased to balance the opposing increased input force $P(A_2 - A_1)$ and the spring force Fs additive thereto, the proportioning piston is again moved rightwardly in the housing toward its isolating position re-engaging the proportioning piston valve member 22 in lapped relation with the seating member valve seat 27 to again isolate the input fluid pressure P in the inlet chamber 47 from the proportionally reduced output fluid pressure Po in the outlet chamber 48. From the graph of FIG. 3, it is apparent that increases in the input fluid pressure P in excess of the predetermined value M but less than the predetermined value T, as shown by the line MT, will result in proportionally reduced increases in the output fluid pressure Po in a predetermined ratio therewith, as shown by the line MS, wherein:

$$Po = [P(A_2 - A_1) + Fc]/A_2.$$

When the proportioning piston 15 is in its isolating position engaging the valve member 22 thereof with the seating member valve seat 27 and the input fluid pressure P at the inlet port 13 is further increased in excess of the predetermined value T but less than the predetermined value N, as shown by the line TN in the graph of FIG. 3, the input force $P\ A_4$ of the input fluid pressure P acting on the effective area $A_4$ of the metering valve 39 overcomes the opposing output force $Po(A_4 - A_3)$ of the output fluid pressure Po at the outlet port 14 acting on the output area $A_4 - A_3$ of said metering valve and the compressive force Fc of the metering spring 46 additive thereto to move said metering valve leftwardly in the guide member bore 37 from its normal isolating position engaged with the proportioning piston valve seat 33 toward a metering position disengaging the proportioning valve seal 44 from said proportioning piston valve seat to effect metered pressure fluid communication between the inlet and outlet chambers 47, 48 through the flow passage C in the proportioning piston 15 to effect a further increase in the output fluid pressure Po at said outlet chamber. The increased output fluid pressure Po in the outlet chamber 48 effects a correspond-ing increase in the output force $Po(A_4 - A_3)$, and when the increased output force $Po(A_4 - A_3)$ and the metering spring force Fc additive thereto attain a value great enough to again balance the opposed input force $P\ A_4$, the metering valve 39 is moved rightwardly to re-engage the seal 44 thereof in lapped relation with the proportioning piston valve seat 33 again interrupting pressure fluid communication between the inlet and outlet chambers 47, 48 and isolating the input fluid pressure P at the inlet port 13 from the proportionally reduced pressure Po at the outlet port 14. From the graph of FIG. 3, it is apparent that increases in the input fluid pressure P in excess of the predetermined value T but less than the predetermined value N, as shown by the line TN, will result in proportionally reduced increases in the output fluid pressure Po in another predetermined ratio therewith, as shown by the line SN wherein:

$$Po = [P(A_4) - Fs]/(A_4 - A_3)$$

When the magnitude of the input fluid pressure P at the inlet port 13 is further increased in excess of the predetermined value N, as shown in the graph of FIG. 2, the input force $P\ A_4$ acting on the metering valve 39 is correspondingly increased to overcome the additive output and metering spring force $Po(A_4 - A_3)$, Fc acting thereon to move siad metering valve leftwardly toward a passage opening or open pressure fluid communication position engaging the leftward end of said metering valve with the end wall of the valve guide member bore 37 and disengaging the metering valve seal 44 from the proportioning piston valve seat 33 to establish open pressure fluid communication between the inlet and outlet chambers 47, 48 thereby blending the inlet and outlet fluid pressures P, Po, as shown by the line NR in the graph of FIG. 3.

When the desired vehicle braking effort is attained by the actuation of the control valve 1, as described hereinbefore, the inlet fluid pressure P at the inlet port 13 is vented to atmosphere which eliminates the input forces $P(A_2 - A_1)$, $P\ A_4$ respectively acting on the proportioning piston and metering valve 15, 39. The exhaustion of the input fluid pressure P establishes a pressure differential across the metering valve 39 between the inlet and outlet ports 13, 14 wherein return flow of the output fluid pressure Po is effected from said outlet port through the flow passage C to said inlet port. Of course, when the exhausting input and output fluid pressures P, Po are so reduced to the predetermined value N, as shown in the graph of FIG. 3, the additive output and spring forces $Po(A_4 - A_3)$, Fc move the metering valve 39 from its passage open position in the flow passage C rightwardly to re-engage the metering valve sealing member 44 with the proportioning piston valve seat 33, and the output fluid pressure Po in the outlet chamber 48 thereafter returns through the return flow passages 43 in said metering valve displacing the lip 45 of the metering valve sealing member 44 from engagement with the metering valve head 42 and exhausting through the inlet port and chamber 13, 47 thereby eliminating the output force $Po(A_4 - A_3)$ acting on said metering valve. When the output fluid pressure Po at the outlet port 14 is so reduced to the predetermined value M, as shown in the graph of FIG. 3, the force Fs of the proportioning spring 25 overcomes the correspondingly reduced output force $Po\ A_2$ acting on the proportioning piston 15 to move said proportioning piston leftwardly from its isolating position disengaging the valve member 22 thereof from the seating member valve seat 27 towards its inoperative position re-engaging the proportioning piston end portion 19 with the housing end wall 4 thereby opening the seating member aperture 26 and effecting open pressure fluid communication through the flow passage B between the inlet and outlet ports 13, 14 to permit the complete exhaustion and return flow of the output fluid pressure to said inlet port.

From the foregoing, it is now apparent that a control valve 1 meeting the objects and advantageous features set forth hereinbefore, as well as others, is disclosed and that changes as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing, modulating means defining with said housing a pressure fluid flow passage therethrough and movable in said housing for performing modulating operation on fluid pressure supplied to said flow passage under preselected conditions, said modulating means being generally operable in response to the supplied fluid pressure to effect the application through said flow passage of an applied fluid pressure in a predetermined ratio with the supplied fluid pressure, passage means in said modulating means connected in parallel flow relation with said flow passage, metering means movable in said passage means for performing metering operations on the supplied fluid pressure between one and other predetermined values thereof subsequent to the modulating operation of said modulating means, said metering means including stem means defining with said modulating means an atmospheric chamber therein, and a pair of opposed differential areas on said metering means respectively subjected to the supplied and applied fluid pressures, said metering means being movable in response to the supplied fluid pressure between the one and other predetermined values acting on one of said areas toward a metering position in said passage means effecting a metered increase in the applied fluid pressure acting on the other of said areas in another predetermined ratio with the supplied fluid pressure between the one and other predetermined values, and said metering means also being thereafter further movable in response to supplied fluid pressure in excess of the other predetermined value acting on said one area toward an open position in said passage means to blend the supplied and applied fluid pressures.

2. A control valve according to claim 1, wherein said one area is predeterminately greater than said other area.

3. A control valve according to claim 1, comprising a valve seat on said modulating means about said passage means, said metering means being normally engaged with said valve seat to close said passage means and being disengaged from said valve seat upon movement toward its metering position.

4. A control valve according to claim 1, comprising abutment means on said metering means for engagement with said modulating means to define the open position of said metering means in said passage means.

5. A control valve according to claim 1, comprising a valve seat on said modulating means about said passage means, said metering means including a valve portion integral with said stem portion for sealing engagement with said valve seat, said one and other opposed areas being on said valve portion, and spring means engaged between said valve portion and modulating means urging said valve portion toward engagement with said valve seat, said valve portion being movable against said spring means and disengaged from said valve seat upon the respective movement of said metering means toward its metering and open positions.

6. A control valve according to claim 1, wherein said modulating means includes piston means movable in said housing and defining therewith said flow passage, a valve member on said piston means, a seating member disposed in said housing about said flow passage for engagement with said valve member, and spring means engaged with said piston means urging said valve member toward an inoperative position disengaged from said seating member, said piston means being initially movable against said spring means in response to supplied and applied fluid pressures of a third predeterminated value predeterminately less than the one predetermined value acting thereon toward an isolating position in said flow passage engaging said valve member with said seating member to isolate the supplied fluid pressure from the applied fluid pressure and said piston means also being thereafter further movable in response to increases in the supplied fluid pressure between said third and one predetermined values acting thereon and assisted by said spring means toward a modulating position in said flow passage disengaging said valve member from said seating member to effect the application through said flow passage of the applied fluid pressure in the first named predetermined ratio with the supplied fluid pressure between the third and one predetermined values.

7. A control valve according to claim 6, comprising a valve seat on said piston means about said passage means, said metering means including another valve member integral with said stem portion for sealing engagement with said valve seat, said stem portion defining with said piston means said atmospheric chamber, and other spring means engaged with said metering means urging said other valve member toward engagement with said valve seat to normally interrupt pressure fluid communication through said passage means between the supplied and applied fluid pressures, said other valve member being disengaged from said valve seat upon the movement of said metering means against said spring means toward the metering and open positions of said metering means.

8. A control valve comprising a housing having inlet and outlet ports therein, a first valve seat in said housing between said inlet and outlet ports, piston means movable in said housing including first valve means for engagement with said first valve seat, first spring means engaged with said piston means and opposing movement of said first valve member toward engagement with said first valve seat, first and second opposed areas on piston means respectively subjected to the fluid pressure at said inlet and outlet ports, said piston means being initially movable against said first spring means in response to fluid pressure at said inlet and outlet ports of a first predetermined value respectively acting on said first and second opposed areas toward a position in said housing engaging said first valve means with said first valve seat to isolate the fluid pressure at said inlet port from that at said outlet port and said piston means also being thereafter further movable in response to increases in the fluid pressure at said inlet port in excess of the first predetermined value and less than a predeterminately greater second predetermined value acting on said first area and assisted by the force of said first spring means toward a metering position in said housing disengaging said first valve means from said first valve seat to establish metered pressure fluid communication between said inlet and outlet ports and increase the fluid pressure at said outlet port acting on said second area in a first predetermined ratio with the fluid pressure at said inlet port between the first and second predetermined values, passage means in said piston means and connected between said inlet and outlet ports, a second valve seat on said piston means about said passage means, second valve means movable in said piston means for engagement with said second valve seat, a stem portion on said second valve means movable in said piston means and defining therewith an atmospheric chamber, opposed third and fourth areas on said second valve means respectively subjected to the fluid pressure at said inlet and outlet ports, and second spring means engaged between said second valve means and said piston means urging said second valve means into engagement with said second valve seat to close said passage means and interrupt pressure fluid communication therethrough between said inlet and outlet ports, said second valve means being movable against said second spring means in response to increases in the fluid pressure in excess of the second predetermined value and less than a predeterminately greater third predetermined value acting on said third area toward a metering position in said passage means disengaged from said second valve seat to establish metered pressure fluid communication through said passage means between said inlet and outlet ports and increase the fluid pressure at said outlet port acting on said fourth area in a second predetermined ration with the fluid pressure at said inlet port between the second and third predetermined values and different than the first predetermined ratio, and abutment means on said piston means for engagement with said stem portion, said second valve means also being further movable against said second spring means and the fluid pressure at said outlet port acting on said fourth area in response to increases in the fluid pressure at said inlet port in excess of the third predetermined value acting on said third area toward an open position in said passage means disengaged from said second valve seat and urging said stem into engagement with said abutment means to blend the fluid pressures at said inlet and outlet ports.

9. A control valve comprising a housing, modulating means defining with said housing opposed inlet and outlet chambers and movable in said housing for performing modulating operations on fluid pressure between said inlet and outlet chambers, said modulating means being operable generally in response to supplied fluid pressure between first and second predetermined values to establish fluid pressure in said outlet chamber in a first predetermined ratio with the supplied fluid pressure between the first and second predetermined values, passage means in said modulating means connected between said inlet and outlet chambers, metering means defining with said modulating means an atmospheric chamber therein and movable in said passage means for performing metering operations on fluid pressure in said passage means between said inlet and outlet chambers, and a pair of opposed differential areas on said metering means respectively subjected to the fluid pressure in said inlet and outlet chambers, said metering means movable in response to fluid pressure in said inlet chamber between said second predetermined value and a third predetermined value predeterminately greater than said second predetermined value acting on one of said areas toward a metering position in said passage means effecting a metered increase in the fluid pressure in said outlet chamber acting on the other of said areas in a second predetermined ratio with the fluid pressure between the second and third predetermined values in said inlet chamber and different than the first predetermined ratio, and said metering means also being further movable in response to fluid pressure in said inlet chamber in excess of the third predetermined value acting on said one area toward an open position in said passage means to blend the fluid pressures in said inlet and outlet chambers.

* * * * *